United States Patent [19]

Devier et al.

[11] Patent Number: 5,267,441
[45] Date of Patent: Dec. 7, 1993

[54] METHOD AND APPARATUS FOR LIMITING THE POWER OUTPUT OF A HYDRAULIC SYSTEM

[75] Inventors: Lonnie J. Devier; John J. Krone, both of Dunlap; Stephen V. Lunzman, Chillicothe; Howard A. Marsden, Pekin, all of Ill.

[73] Assignee: Caterpillar Inc., Peoria, Ill.

[21] Appl. No.: 819,704

[22] Filed: Jan. 13, 1992

[51] Int. Cl.$^5$ ............................................ F16D 31/02
[52] U.S. Cl. ...................................................... 60/452
[58] Field of Search ................. 60/431, 445, 448, 449, 60/431, 449, 452; 417/18, 34, 212, 222 S, 274; 318/644, 645

[56] References Cited

U.S. PATENT DOCUMENTS

| | | |
|---|---|---|
| 3,821,625 | 6/1974 | Scholl . |
| 3,927,528 | 12/1975 | van der Kolk et al. ............... 60/431 |
| 4,510,750 | 4/1985 | Izumi et al. .......................... 60/452 X |
| 4,518,318 | 5/1985 | Jensen et al. ........................... 417/53 |
| 4,523,892 | 6/1985 | Mitchell et al. .................... 60/431 X |
| 4,534,707 | 8/1985 | Mitchell .............................. 60/431 X |
| 4,655,689 | 4/1987 | Westveer et al. ................... 60/449 X |
| 4,678,404 | 7/1987 | Lorett et al. ......................... 417/53 X |
| 4,712,376 | 12/1987 | Handank ................................ 60/427 |
| 4,718,329 | 1/1988 | Nakajima et al. . |
| 4,726,186 | 2/1988 | Tatsumi et al. ........................ 60/434 |
| 4,741,159 | 5/1988 | Gunda et al. .......................... 60/443 |
| 4,809,504 | 3/1989 | Izumi et al. ........................ 60/449 X |
| 4,823,552 | 4/1989 | Ezell et al. ......................... 60/445 X |
| 4,967,557 | 11/1990 | Izumi et al. ........................ 60/431 X |
| 5,048,293 | 9/1991 | Aoyagi .............................. 60/452 X |
| 5,064,351 | 11/1991 | Hamey et al. ...................... 417/222.1 |
| 5,077,973 | 1/1992 | Suzuki et al. ..................... 60/431 X |
| 5,129,230 | 7/1992 | Izumi et al. .......................... 60/452 |
| 5,170,625 | 12/1992 | Watanabe et al. ..................... 60/452 |
| 5,177,964 | 1/1993 | Tanaka et al. ..................... 60/452 X |

FOREIGN PATENT DOCUMENTS

0235545B1 9/1990 European Pat. Off. .

OTHER PUBLICATIONS

Application Ser. No. 07/817,569, filed Jan. 7, 1992, Title: Hydraulic Control Apparatus, Attorney Docket No.: 91-318.

Primary Examiner—Edward K. Look
Assistant Examiner—John Ryznic
Attorney, Agent, or Firm—David M. Masterson

[57] ABSTRACT

An apparatus for limiting the power output of a hydraulic system is disclosed. The hydraulic system has a variable displacement pump. The variable displacement pump has a movable swashplate and is driven by a source of motive power. The apparatus includes a memory device for storing a set of power modes. Each power mode has a predetermined power level associated with the hydraulic system and is defined by a plurality of set points. Each set point corresponds to a predetermined flow rate and discharge pressure of the pump. A device senses the speed of the source of motive power and producing a signal representative of the actual speed in response to the sensed speed. A device senses the pressure of the variable displacement pump and produces a signal representative of the actual pressure in response to the sensed pressure. A device senses the swashplate angle of the variable displacement pump and delivers a signal representative of the actual swashplate angle in response to the sensed swashplate angle. A device receives a desired power mode signal having a desired power level. The desired power level is different from the predetermined power levels associated with the set of power modes. A control device receives the actual speed, pressure and swashplate angle signals, and responsively determines a desired flow limit of the pump. The desired flow limit corresponds to the desired power level.

14 Claims, 6 Drawing Sheets

Fig.1

Fig_2_

Fig. 3

Fig_4_

Fig_5_

Fig_6_

Fig_7_

METHOD AND APPARATUS FOR LIMITING THE POWER OUTPUT OF A HYDRAULIC SYSTEM

DESCRIPTION

1. Technical Field

This invention relates generally to a method for limiting the power output of a hydraulic system and, more particularly, to a method which limits the power output of a hydraulic system between an infinite range of maximum and minimum power levels.

2. Background Art

In the field of hydrostatic vehicles, for example, excavators and variable displacement hydraulic pumps are typically driven by a prime mover, providing hydraulic power to a plurality of work implements as well as to the drive system. Excavators, being extremely versatile machines, are useful in performing a large number of different and varied tasks (e.g. pipelaying, mass excavation, trenching, logging, etc.), each task having its own unique power requirements. For example, during mass excavation, hydraulic power requirements are quite high, but in pipelaying, sustained periods of low flow are common.

Prior art has shown that controllability and fuel savings can be realized by reducing pump displacement to limit the power output of the hydraulic system. Typically, the operator selects one of a discrete number of power modes which limits the power output of the system. Allegedly, the selected power mode corresponds to a needed power level associated with a particular task. For instance, an electronic control system controls the swashplate inclination on a variable displacement pump in response to an operator selected power mode. In this manner, the system provides the hydraulic flow requested by the operator reducing the power output of the hydraulic system. Unfortunately only a limited, finite number of power modes are available to the operator. Since any one task may need, not a limited number of power level, but practically an infinite number of power levels, a finite number of power modes is impractical. Consequently, the operator is unable to select a power mode which is consistent with the needed power requirements of a particular task. Therefore, optimum controllability of the hydraulic system for a varied number of tasks is not achievable.

The present invention is directed to overcoming one or more of the problems as set forth above.

DISCLOSURE OF THE INVENTION

In one aspect of the present invention, an apparatus for limiting the power output of a hydraulic system is disclosed. The hydraulic system has a variable displacement pump. The variable displacement pump has a movable swashplate and is driven by a source of motive power. The apparatus includes a device for storing a set of power modes. Each power mode has a predetermined power level associated with the hydraulic system and is defined by a plurality of set points. Each set point corresponds to a predetermined flow rate and discharge pressure of the pump. A device senses the speed of the source of motive power and producing a signal representative of the actual speed in response to the sensed speed. A device senses the pressure of the variable displacement pump and produces a signal representative of the actual pressure in response to the sensed pressure. A device senses the swashplate angle of the variable displacement pump and delivers a signal representative of the actual swashplate angle in response to the sensed swashplate angle. A device receives a desired power mode signal having a desired power level. The desired power level is different from the predetermined power levels associated with the set of power modes. A control device receives the actual speed, pressure and swashplate angle signals, and responsively determines a desired flow limit of the pump. The desired flow limit corresponds to the desired power level.

BRIEF DESCRIPTION OF THE DRAWINGS

For a better understanding of the present invention, reference may be made to the accompanying drawings in which.

BEST MODE FOR CARRYING OUT THE INVENTION

Figure 1:
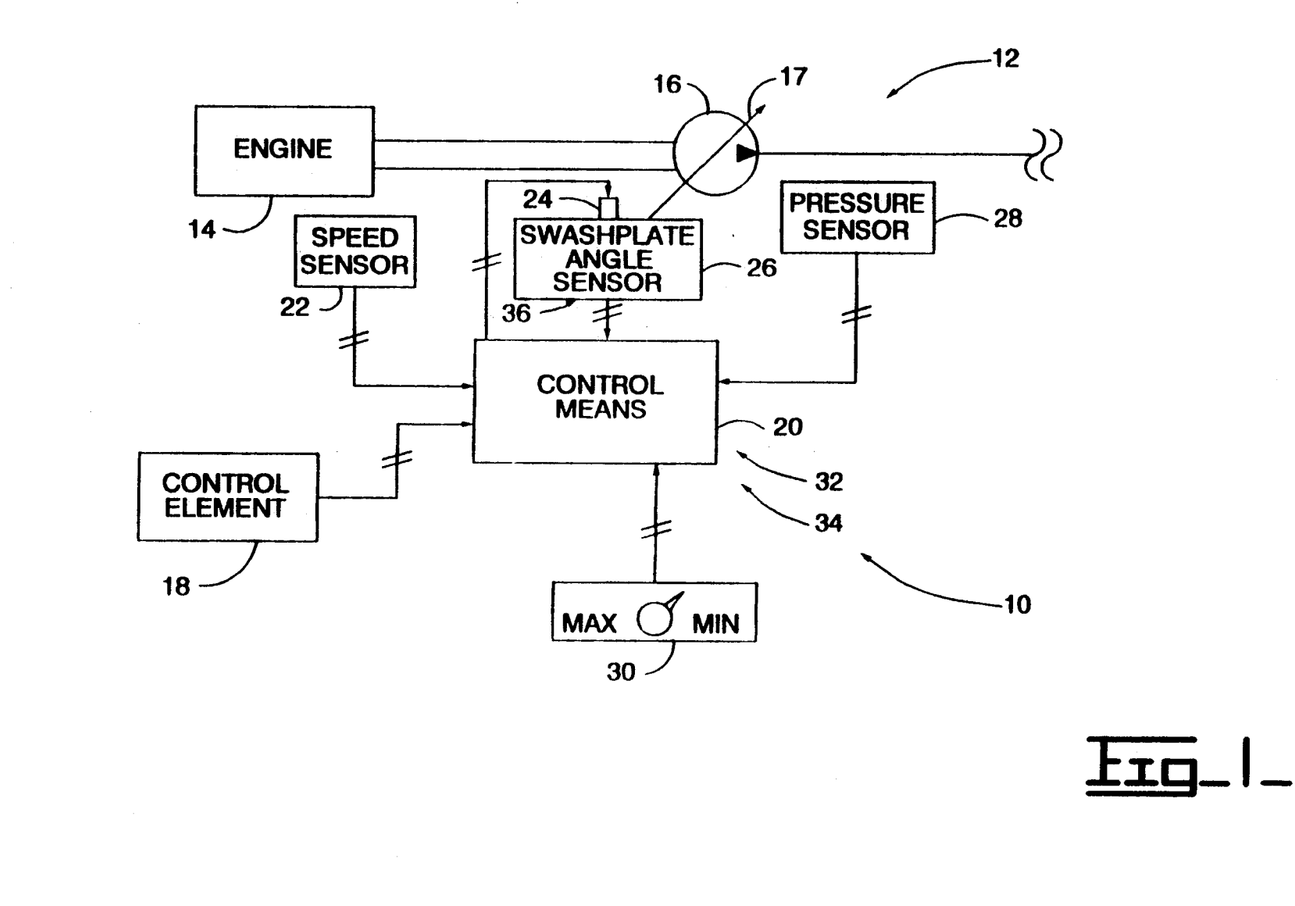
FIG. 1 is a diagrammatic view of an embodiment of a hydraulic system of the present invention.

FIG. 1 illustrates an embodiment of the electrohydraulic system associated with the present invention. Fluid system 12 on a work vehicle, such as an hydraulic excavator or loader, includes a source and motive power 14, commonly an engine. The source of motive power drives one or more variable displacement pumps 16 which deliver fluid to a plurality of work elements (not shown). Each pump 16 has an adjustable swashplate 17.

An operator control element 18, for example an electronic joy stick, is connected to a control means 20. The operator control element 18 provides a demand signal indicative of fluid flow to a respective work element.

Information is provided by a speed sensing means 22, for example a device sensitive to the movement of gear teeth on an engine, as is known in the art. The device 22 delivers a signal to the control system 20 representative of the actual speed of the source of motive power. The hydraulic system 12 includes a pump regulator 24 connected to the pump for controlling a displacement volume of the pump. The regulator 24 includes a sensing device 26 adapted to sense the swashplate angle of the pump 16 and deliver a signal representative of the swashplate angle to the control means 20. Responsively, the control means 20 determines the pump displacement based on the swashplate angle signal and the engine speed signal. The hydraulic system 12 further includes a pressure sensing device 28 adapted to sense the discharge pressure of the pump and deliver a signal representative of the actual pressure to the control means 20.

The operator has the capability to select a plurality of power modes which represent a desired maximum power level of the hydraulic system 12. A switching device 30 is provided which allows the operator to select a predetermined power level associated with a selected power mode. The device 30 is electrically connected to the control means 20. The device 30 preferably is in the form of a dial which has a plurality of discrete settings, each setting resulting in an electrical signal having a predetermined magnitude which corresponds to a respective power mode. Thus, when the dial is rotated an electrical signal representative of a desired power mode is generated. For instance, the device 30 may include a potentiometer or digital convertor for producing distinguishable signals representative desired operator settings. Advantageously, the control means 20 limits the power level of the hydraulic system to the predetermined power level of a discrete power mode.

Figure 2:
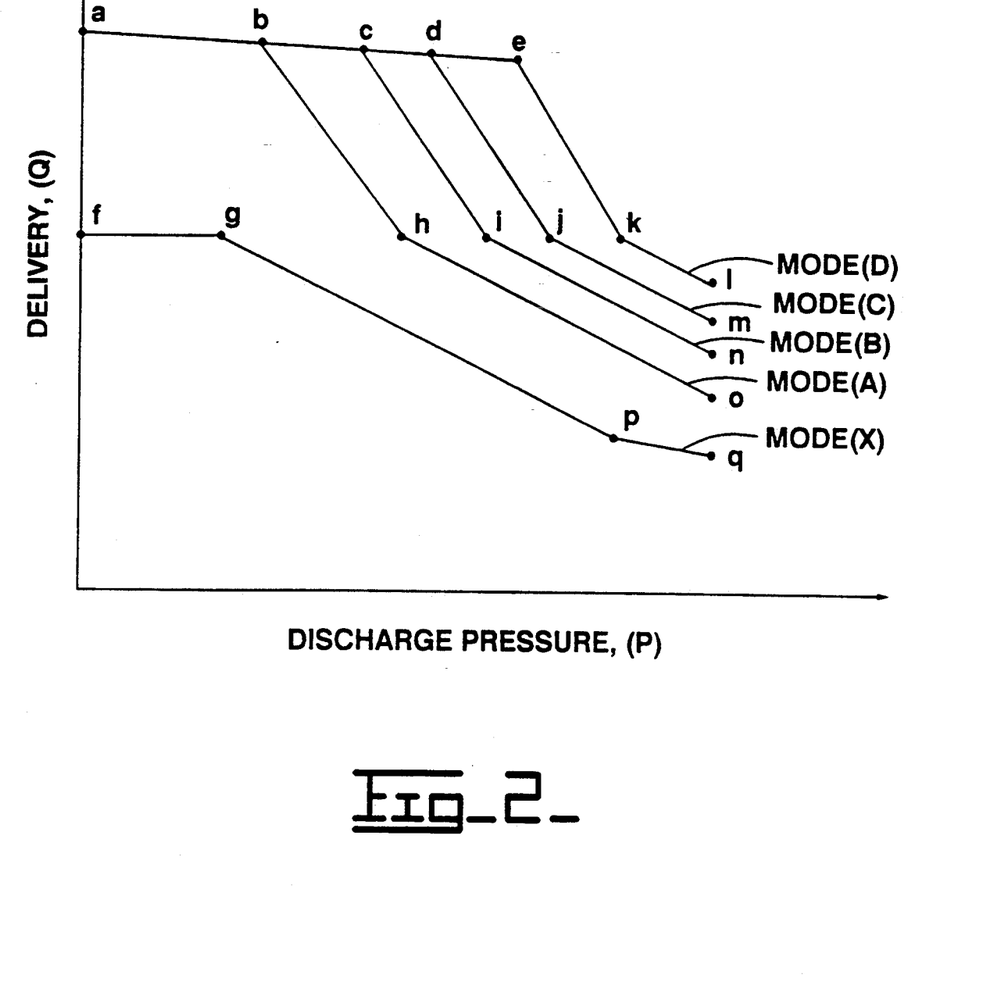
FIG. 2 is a graph illustrating discrete power modes.

An example set of power modes are depicted on FIG. 2. Each power mode is defined by a plurality of set points wherein each set point corresponds to a predetermined flow rate and discharge pressure of the pump. Further, the set points associated with a respective power mode corresponds to a predetermined power level. As shown, the five power modes are labeled X, A, B, C, D. Thus, the five power modes provide for five different power levels for the hydraulic system. For example, mode (X) describes the minimum power level while mode (D) describes the maximum power level for the hydraulic system. The actual values of the set points a thru q describe the power modes which are dependant on the available engine and hydraulic system characteristics. The power modes of FIG. 2 are stored in read-only-memory 32 or the like in the control means 20 as a look-up table. The number of power modes stored in memory is dependent upon the desired precision of the system.

The control means 20 is a microprocessor base control, as is well known in the art, which utilizes programming logic for computing and decision making processes. The program may be stored in read-only-memory or the like. Algorithms, important to the function of the control means 20, are shown in the flow charts beginning with FIG. 3.

The present invention associated with the apparatus 10 provides the operator the capability to select a range of power modes not explicitly defined plurality of power modes but is within the power range of the hydraulic system. Thus, the control means 20 limits the power level of the hydraulic system to the selected power mode. In the present example, the limits of the system are defined by the mode (X) and mode (D). For example assume that the switch 30 specifies a power mode, represented by an electrical signal having a magnitude of $Y_N$, different from any signal which represents the predetermined power modes. Advantageously, an algorithm is then implemented by the control means 20 to determine a desired pump flow of the system associated with the desired power mode. The algorithm is depicted by the flow charts beginning with FIG. 3.

The flowcharts illustrate a computer software program for implementing the preferred embodiment of the present invention. The program depicted in these flowcharts is particularly well adapted for use with the microcomputer and associated components described above, although any suitable microcomputer may be utilized in practicing an embodiment of the present invention. The flowcharts described constitute a complete and workable design of the preferred software program.

Figure 3:
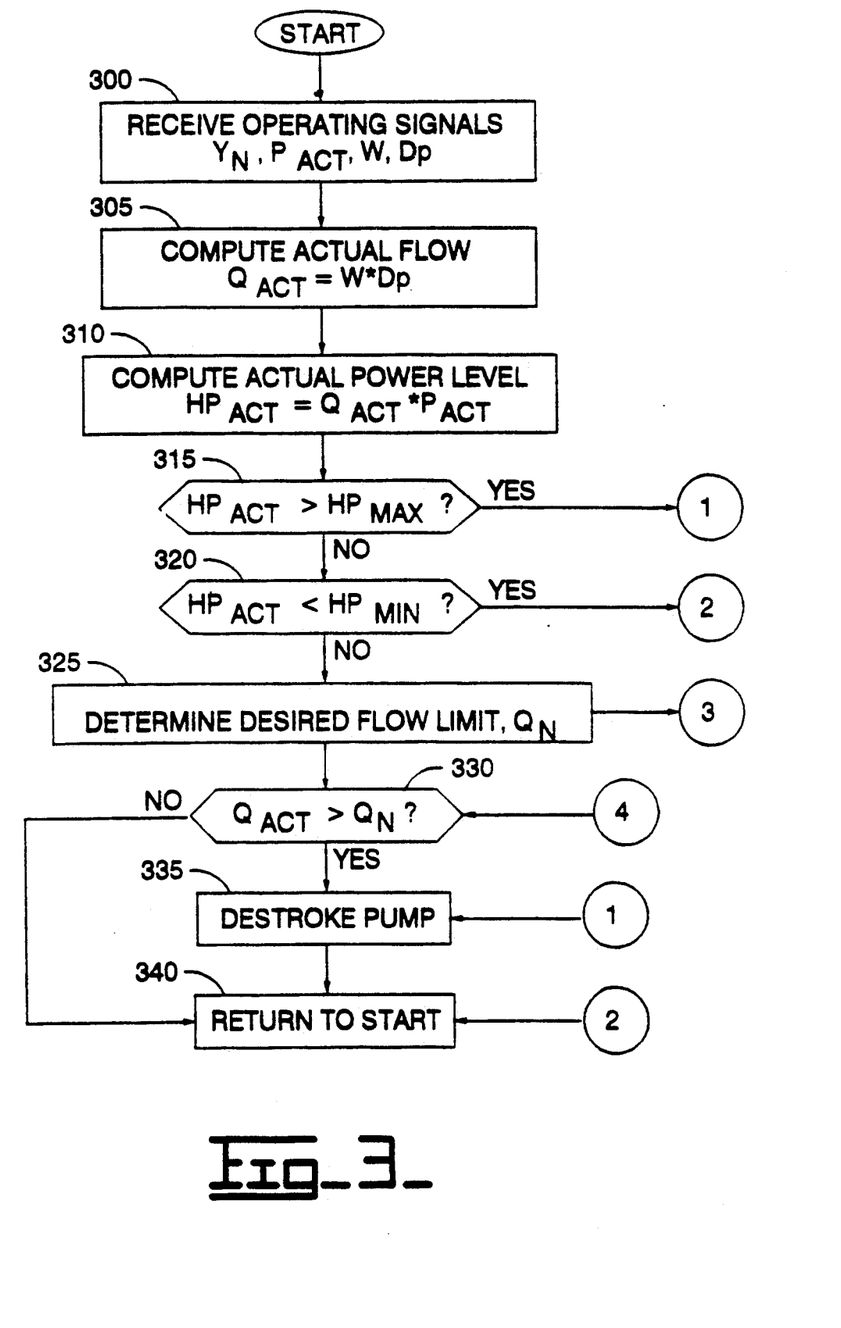
FIG. 3 is a flow chart depicting the algorithm performed by an electronic system associated with the present invention.

Referring now to FIG. 3, the algorithm receives the various values associated with the operating signals in block 300. The operating signals received are: the desired power mode signal, $Y_N$; the actual pressure signal, $P_{ACT}$; the actual engine speed signal, $\omega$, and the actual pump displacement signal, $D_p$. In block 305 the actual flow rate, $Q_{ACT}$, of the pump is calculated by the illustrated formula. Once the actual flow rate, $Q_{ACT}$, is calculated the algorithm then determines the power level, $HP_{ACT}$, of the hydraulic system as shown by block 310.

In block 315 the algorithm determines if the power level, $HP_{ACT}$, is greater than the maximum power level, $HP_{MAX}$, of the hydraulic system. Adverting back to FIG. 2 the maximum power level is defined by mode (D). If the algorithm determines that the power level, $HP_{ACT}$, is greater than the maximum power level, $HP_{MAX}$, then the algorithm skips to block 335. Otherwise, in block 320 the algorithm determines if the power level, $HP_{ACT}$, is less than the minimum power level, $HP_{MIN}$. As shown by FIG. 2, the minimum power level is defined by mode (X). If the power level, $HP_{ACT}$, is less than the minimum power level, $HP_{MIN}$, then the algorithm proceeds to block 340. Otherwise the power level, $HP_{ACT}$, is between the minimum and maximum power levels and the algorithm continues to block 325.

Block 325 determines the desired flow limit, $Q_N$ associated with the desired power mode, N. Since the actual flow rate, $Q_{ACT}$, and the discharge pressure, $P_{ACT}$, of the pump have been calculated, the current operating condition is illustrated by point 1 shown by FIG. 5.

Figure 4:
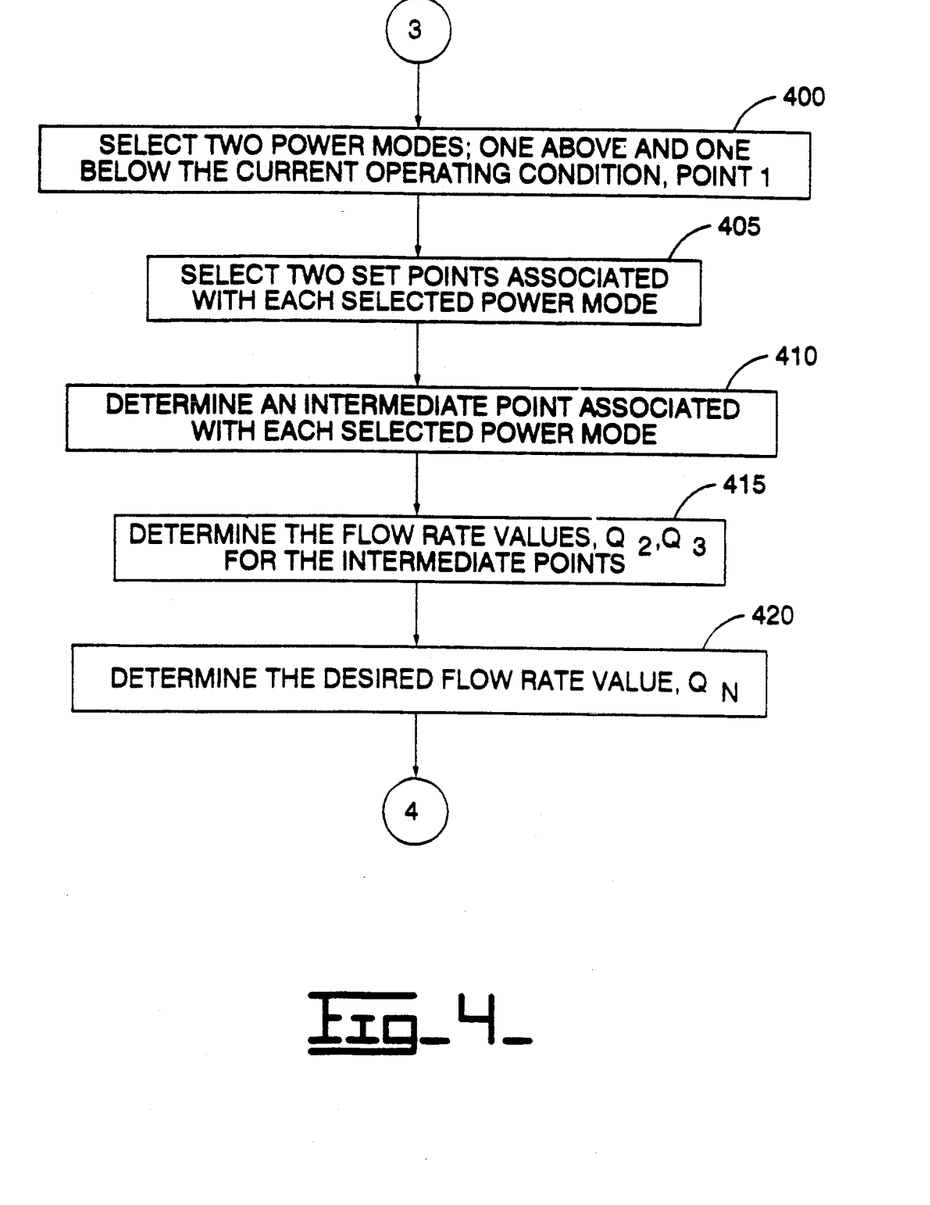
FIG. 4 is a flow chart depicting the algorithm performed by an electronic system associated with the present invention.

With reference made to FIG. 4, the desired flow limit $Q_N$ is calculated. In block 400 two power modes are selected. The algorithm determines which power mode is nearer to the current operating condition, point 1, by the following criteria:

(a) One power mode must have a power level lessor than the actual power level, $HP_{ACT}$.

(b) The other power mode must have a power level greater than the actual power level, $HP_{ACT}$.

Figure 5:
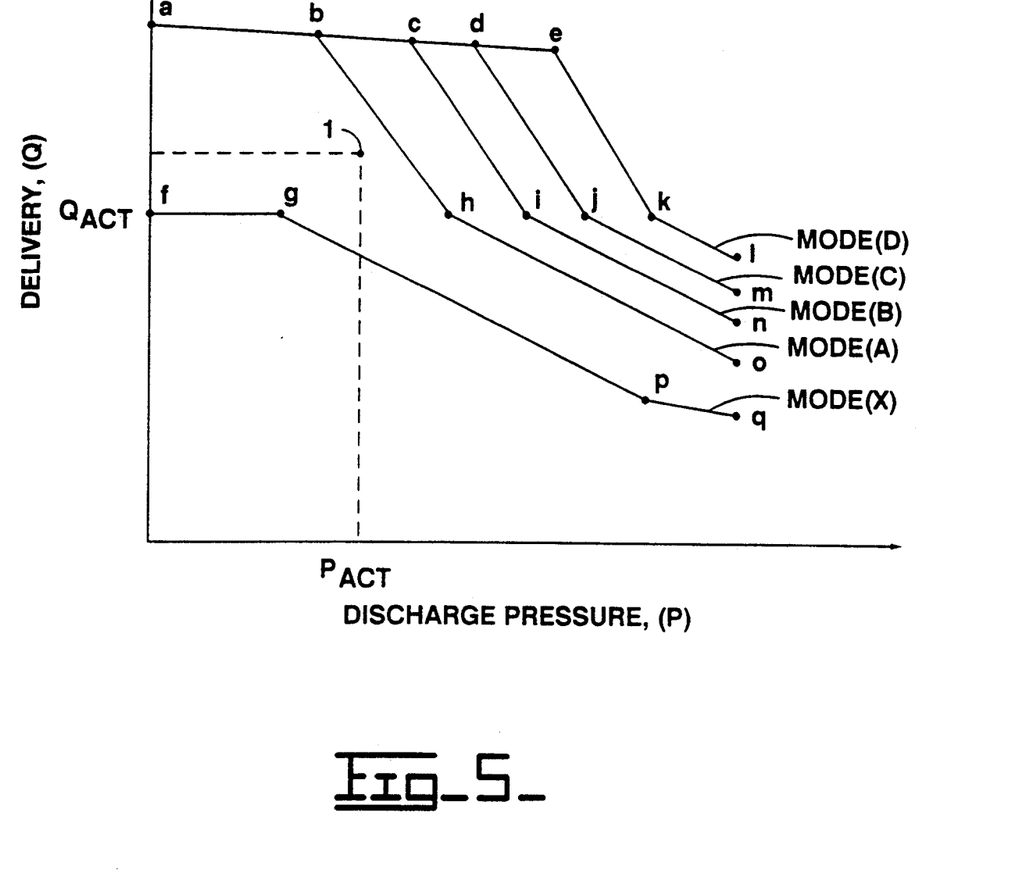
FIG. 5 is a graph illustrating the discrete power modes shown with an actual power level.

The power level corresponding to each mode is found by multiplying the flow rate, Q, by the pressure level, P, associated with one of the respective set points. In the preferred embodiment, the algorithm will begin with the power mode having the lowest power level then step through and calculate the power levels associated with the remainder of the power modes until the criteria is satisfied. As shown by FIG. 5, the two modes selected are mode (X) and mode (A). Once the two power modes are selected then the algorithm continues to block 405.

In block 405 the algorithm selects two set points associated with each selected power mode. The criteria for selection is as follows:

(a) the first set point associated with each power mode must correspond to a pressure value which is nearer but less than the actual pressure, $P_{ACT}$.

(b) the second set point associated with each power mode must correspond to a pressure value which is nearer but greater than the actual pressure, $P_{ACT}$.

Figure 6:
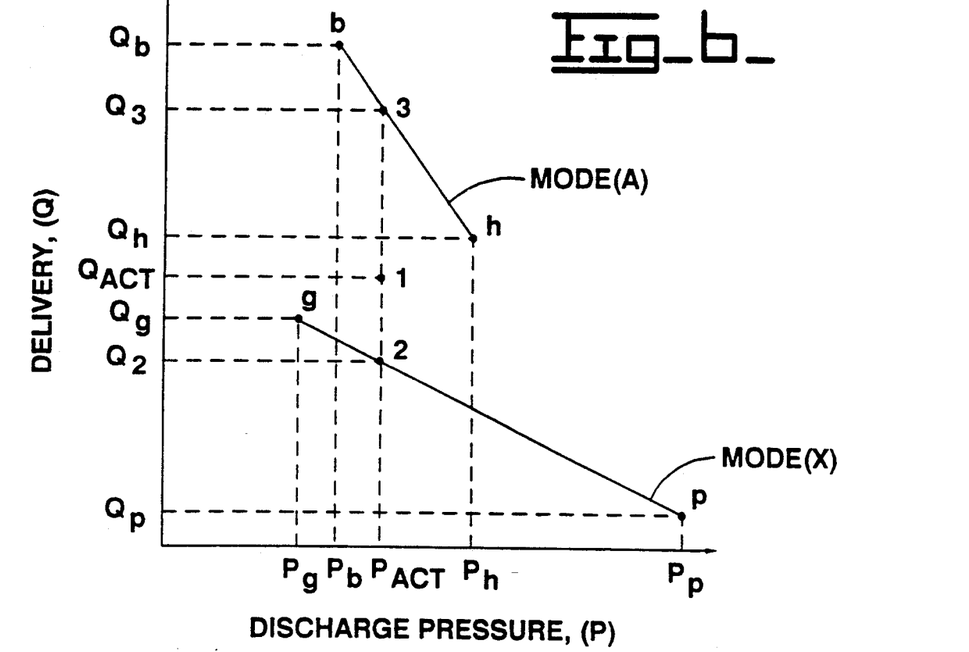
FIG. 6 is a graph illustrating selected power modes shown with the actual power level.
Figure 7:
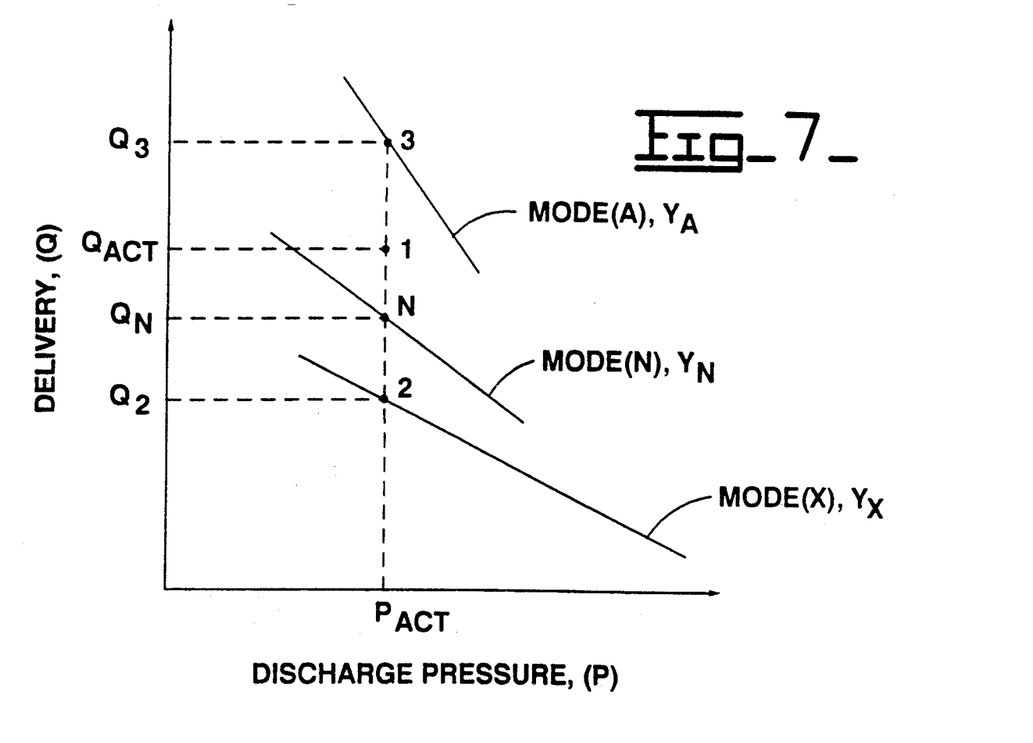
FIG. 7 is a graph illustrating the selected power modes shown with the actual and desired power levels.

As shown by FIG. 6, the two set points associated with mode (X) are points g and p. The two set points associated with mode (A) are points b and h. Once the two set points are determined for each selected power mode the algorithm then continues to block 410.

In block 410 the algorithm determines an intermediate point associated with each selected power mode. The intermediate point is a point associated with each power mode which has a pressure value equal to the actual pressure, $P_{ACT}$. In FIG. 6, the intermediate point of mode (X) is point 2 and the intermediate point of mode (A) is point 3.

In block 415 the algorithm then determines the flow rate value, $Q_2$, $Q_3$ for each of the intermediate points, points 2 and 3 respectively. The flow rate values for each intermediate point is found by the following equations:

$$Q_2 = Q_b - \frac{(P_{ACT} - P_b)}{(P_h - P_b)} (Q_b - Q_h)$$

$$Q_3 = Q_g - \frac{(P_{ACT} - P_g)}{(P_p - P_g)} (Q_g - Q_p)$$

The flow rate values $Q_2$, $Q_3$ are estimated mathematically by linear interpolation. Although linear interpolation is utilized, those skilled in the art may recognize that other interpolation schemes may be readily performed without departing from the spirit of the present invention.

From the values calculated in block 415 the desired flow rate value, $Q_N$, is determined in the block 420.

$$Q_N = Q_2 - \frac{(Y_A - Y_N)}{(Y_A - Y_X)} (Q_2 - Q_3)$$

where $Y_A$ corresponds to a predetermined magnitude of the electrical signal produced by the switching device 30 representing the power mode (A). Similarly $Y_X$ corresponds to a predetermined magnitude of the electrical signal produced by the switching device 30 representing the power mode (X). As described earlier, $Y_N$ corresponds to the magnitude of the electrical signal representing the desired power mode (N).

Once $Q_N$ is calculated the algorithm continues to block 330 of FIG. 3. If the actual flow rate, $Q_{ACT}$, is greater than the desired flow limit, $Q_N$, the algorithm continues to block 335.

In the block 335 the control means 20 delivers a command signal to the pump regulator 24. Responsively the pump regulator 24 controls the inclination of the swashplate 17 thereby reducing the pump displacement to the desired level. Advantageously the command signal is representative of a flow rate having a value corresponding to the actual pressure value associated with that of the maximum power level, as determined in block 315. Or the command signal is representative of a flow rate having a value as determined in block 325.

Industrial Applicability

The present invention is useful for many hydraulic work vehicles in a large number of applications, for example an hydraulic excavator. When an excavator is involved in a pipe laying process, for example, hydraulic cylinder movements are slow. This type of work requires relatively low cylinder loads and precise positioning of the load, thus little power is needed from the hydraulic system. In other applications, the excavator must perform quickly, possibly under high loads. One such example is the digging of virgin soil.

The present invention provides the operator the capability to limit the power output of the hydraulic system to an infinite number of power levels. As the vehicle's application may vary, the desired power level of the hydraulic system may vary as well. In traditional designs, the operator is limited to reducing the power level to a finite number of discrete power modes. However, the present invention gives the operator the ability to reduce the power level of the hydraulic system to power modes which are not explicitly defined. Therefore the operator can have greater controllability of the work cylinders in many vehicle applications, while the excavator achieves good fuel economy.

Advantageously the present invention gives the operator the capability to select an infinite number of power modes from a range defined by a minimum and maximum power level of the hydraulic system. Thus an operator can "fine-tune" the hydraulic system, within the operating characteristics of the vehicle, realizing superior vehicle performance.

Other aspects, objects and advantages of the present invention can be obtained from a study of the drawings, the disclosure and the appended claims.

We claim:

1. A method for limiting the power output of a hydraulic system, said hydraulic system having a variable displacement pump for delivering pressurized fluid to a work element, said variable displacement pump having a movable swashplate and being driven by a source of motive power, comprising the steps of:

storing a set of power modes, each power mode having a predetermined power level associated with said hydraulic system and being defined by a plurality of set points wherein each set point corresponds to a predetermined flow rate and discharge pressure of said pump, each predetermined power level being independent to a desired speed of said motive power source;

sensing the pressure of said variable displacement pump and producing a signal representative of the actual pressure in response to said sensed pressure;

producing a desired power mode signal indicative of a desired power level of said hydraulic system, the desired power level being different from the predetermined power levels associated with said set of power modes; and receiving said desired power mode and pressure signals, and responsively determining a desired flow limit of said pump based on the predetermined power levels, said desired flow limit corresponding to the desired power level.

2. A method, as set forth in claim 1, including the steps of:

sensing the swashplate angle of said variable displacement pump and delivering a signal representative of the actual swashplate angle in response to said sensed swashplate angle;

sensing the speed of said source of motive power and producing a signal representative of the actual speed in response to said sensed speed; and calculating the actual flow rate of said pump in response to said receiving said actual speed and swashplate angle signals.

3. A method, as set forth in claim 2, including the steps of comparing the actual flow rate with the desired flow limit and reducing the pump displacement to the desired flow limit in response to the actual flow rate being greater than the desired flow limit.

4. A method, as set forth in claim 3, including the step of calculating the actual power level of said hydraulic system in response to receiving said actual pressure signal and calculating said actual flow rate of said pump.

5. A method, as set forth in claim 4, wherein one of the power modes of the set of power modes defines the hydraulic systems maximum power level, and including the steps of comparing the actual power level with the maximum power level and reducing the pump displacement to a flow rate associated with the one power mode in response to the actual power level being greater than the maximum power level.

6. A method, as set forth in claim 4, wherein the step of determining the desired flow limit includes the step of selecting two power modes from said set of power modes, the selected power modes having power levels nearer to the actual power level than the other power modes in said set, one of the selected power modes having a power level greater than the actual power level and the other selected power mode having a power level lessor than the actual power level.

7. A method, as set forth in claim 6, including the step selecting two set points from the plurality of set points associated each selected power mode, the two selected set points having pressure values nearer to the actual pump pressure than the other set points in the respective selected mode, one of the selected set points corresponding to a pressure greater than the actual pump pressure while the other selected set point corresponds to a pressure lessor than the actual pressure.

8. A method, as set forth in claim 7, including the step of calculating an intermediate point associated with each selected power mode, the intermediate point having a pressure value equal to the actual pump pressure.

9. A method, as set forth in claim 8, including the step of calculating a flow rate value associated with each intermediate point.

10. A method, as set forth in claim 9, wherein said desired flow limit is determined in response to calculating the intermediate point flow rate values.

11. An apparatus for limiting the power output of a hydraulic system, said hydraulic system having a variable displacement pump for delivering pressurized fluid to a work element, said variable displacement pump having a movable swashplate and being driven by a source of motive power, comprising:
means for storing a set of power modes, each power mode having a predetermined power level associated with said hydraulic system and being defined by a plurality of set points wherein each set point corresponds to a predetermined flow rate and discharge pressure of said pump, each predetermined power level being independent to a desired speed of said motive power source;
means for sensing the pressure of said variable displacement pump and producing a signal representative of the actual pressure in response to said sensed pressure;
power control means for producing a desired power mode signal indicative of a desired power level of said hydraulic system, the desired power level being different from the predetermined power levels associated with said set of power modes; and
electronic control means for receiving said desired power mode and pressure signals, and responsively determining a desired flow limit of said pump based on the predetermined power levels, said desired flow limit corresponding to the desired power level.

12. An apparatus, as set forth in claim 11, including:
means for sensing the swashplate angle of said variable displacement pump and delivering a signal representative of the actual swashplate angle in response to said sensed swashplate angle;
means for sensing the speed of said source of motive power and producing a signal representative of the actual speed in response to said sensed speed; and
means for calculating the actual flow rate of said pump in response to said receiving said actual speed and swashplate angle signals.

13. An apparatus, as set forth in claim 12, wherein said control means includes means for comparing the actual flow rate with the desired flow limit and producing a command signal in response to the actual flow rate being greater than the desired flow limit.

14. An apparatus, as set forth in claim 13, wherein said swashplate angle sensing means includes means for receiving said command signal and responsively controlling the inclination of the swashplate.

* * * * *